US011657732B2

(12) United States Patent
Bennett

(10) Patent No.: US 11,657,732 B2
(45) Date of Patent: May 23, 2023

(54) ANIMAL DENTISTRY TRAINING APPARATUS

(71) Applicant: Mars, Incorporated, McLean, VA (US)

(72) Inventor: Marie-Louise Amanda Bennett, Batley (GB)

(73) Assignee: Mars, Incorporated, McLean, VA (US)

( * ) Notice: Subject to any disclaimer, the term of this patent is extended or adjusted under 35 U.S.C. 154(b) by 778 days.

(21) Appl. No.: 15/757,185

(22) PCT Filed: Sep. 2, 2016

(86) PCT No.: PCT/GB2016/052721
§ 371 (c)(1),
(2) Date: Mar. 2, 2018

(87) PCT Pub. No.: WO2017/037474
PCT Pub. Date: Mar. 9, 2017

(65) Prior Publication Data
US 2018/0268742 A1    Sep. 20, 2018

(30) Foreign Application Priority Data

Sep. 4, 2015  (GB) ..................................... 1515722

(51) Int. Cl.
G09B 23/28    (2006.01)
G09B 23/34    (2006.01)

(52) U.S. Cl.
CPC ........... *G09B 23/283* (2013.01); *G09B 23/34* (2013.01)

(58) Field of Classification Search
CPC .............................. G09B 23/283; G09B 23/34
(Continued)

(56) References Cited

U.S. PATENT DOCUMENTS 2,256,667 A  *  9/1941  Doret .................... G09B 23/283
                                                            434/263
2,674,802 A       4/1954  Williams
(Continued)

FOREIGN PATENT DOCUMENTS

CA        2355958        3/2002
CN      201402553        2/2010
(Continued)

OTHER PUBLICATIONS

"3D Dental Learning Vet Wholesaler, Royal Canin launches 3D dental learning resource developed by Mars Petcare", Retrieved Jul. 13, 2016 from the internet: URL: http://www.vetwholesaler.co.uk/royal-canine-3d-learning-resource (Nov. 16, 2016), 3 pages.
(Continued)

*Primary Examiner* — Thomas J Hong

(57) ABSTRACT

An animal dentistry training and assessment apparatus comprising a sectioned artificial tooth, comprising a crown portion and a furcate root portion, the furcate root portion comprising a plurality of roots; and a base comprising a receiving portion configured to receive and releasably retain each root of the furcate root portion. The sectioned artificial tooth is sectioned into a plurality of sections comprising one or more but not all of said roots of the furcate root portion and part of the crown portion, the plurality of sections being contiguous when the sectioned artificial tooth is received in the receiving portion.

12 Claims, 4 Drawing Sheets

(58) Field of Classification Search
USPC .......................................................... 434/263
See application file for complete search history.

(56) References Cited

U.S. PATENT DOCUMENTS

| | | | |
|---|---|---|---|
| 3,823,476 | A | 7/1974 | Hudson et al. |
| 4,172,867 | A | 10/1979 | Devault |
| D286,059 | S | 10/1986 | Craft et al. |
| 4,770,637 | A | 9/1988 | Harrell et al. |
| 5,120,229 | A | 6/1992 | Moore et al. |
| 6,461,164 | B1 | 10/2002 | Ramelli |
| D487,314 | S | 3/2004 | Culp et al. |
| D582,558 | S | 12/2008 | Sachs et al. |
| 7,537,455 | B2 | 5/2009 | Cope |
| D632,393 | S | 2/2011 | Sato et al. |
| D632,394 | S | 2/2011 | Sato et al. |
| 7,942,672 | B2 | 5/2011 | Kuo |
| 8,099,268 | B2 | 1/2012 | Kitching et al. |
| 8,267,695 | B2 | 9/2012 | Kadobayashi et al. |
| D698,695 | S | 2/2014 | Quigless et al. |
| D718,457 | S | 11/2014 | Ose et al. |
| D731,654 | S | 6/2015 | Massad et al. |
| 9,092,997 | B2 | 7/2015 | Baekgard et al. |
| 9,378,660 | B1 | 6/2016 | Adell |
| D762,859 | S | 8/2016 | Hall |
| 2004/0191739 | A1 | 9/2004 | Lee |
| 2007/0166665 | A1* | 7/2007 | Cope ................... G09B 23/30 433/213 |
| 2008/0254400 | A1 | 10/2008 | Scherl et al. |
| 2014/0228992 | A1 | 8/2014 | Van Lierde |
| 2017/0004736 | A1* | 1/2017 | Lee ..................... G09B 23/283 |

FOREIGN PATENT DOCUMENTS

| | | |
|---|---|---|
| DE | 4130274 | 3/1993 |
| DE | 10146292 A1 | 8/2002 |
| JP | 2004126406 | 4/2004 |
| JP | 3182224 B2 | 2/2013 |
| RU | 2385688 C2 | 4/2010 |
| RU | 2407480 C1 | 12/2010 |
| RU | 2423949 C1 | 7/2011 |
| SU | 1708326 A1 | 1/1992 |
| WO | 9734278 | 9/1997 |
| WO | 2012002488 A1 | 1/2012 |

OTHER PUBLICATIONS

"Veterinary Instrumentation: Dental Equipment & Instrumentation, Feline Dental Model Clear", Retrieved from the Internet Nov. 16, 2016: URL: www.http://www.veterinary-instrumentation.co.uk/product.php?productid=2994&cat=311&page=1, 2 pgs.

Veterinarian Dentistry, "Multi-rooted Dog Teeth", http://www.web.archive.org/web/20131026020845/http://www.rvc.ac.uk/review/Dentistry/Extraction/Multi.html, Oct. 26, 2013, 3 pages.

Veterinary Instrumentation, "Set of Both Canine and Feline Dental Models", http://www.veterinary-instrumentation.co.uk/product.php?productid=2253&cat=311&page=1, Feb. 11, 2016, 2 pages.

Woodward, "General Principles of Surgical Extractions", http://www.web.archive.org/web/20141015085301/http://dentalaireproducts.com/extractions-part-2, Oct. 15, 2014, 3 pages.

Tooth Extraction Multi-rooted Dog Teeth, Veterinary Dentistry, Oct. 26, 2014, [Online]Veterinary Dentistry Oct. 26, 2014, [search on Sep. 9, 2020], URL, 5 https://web.archive.org/web/20131026020845/https://www.rvc.ac.uk/review/dentistry/extraction/multi.html. 3 pages.

* cited by examiner

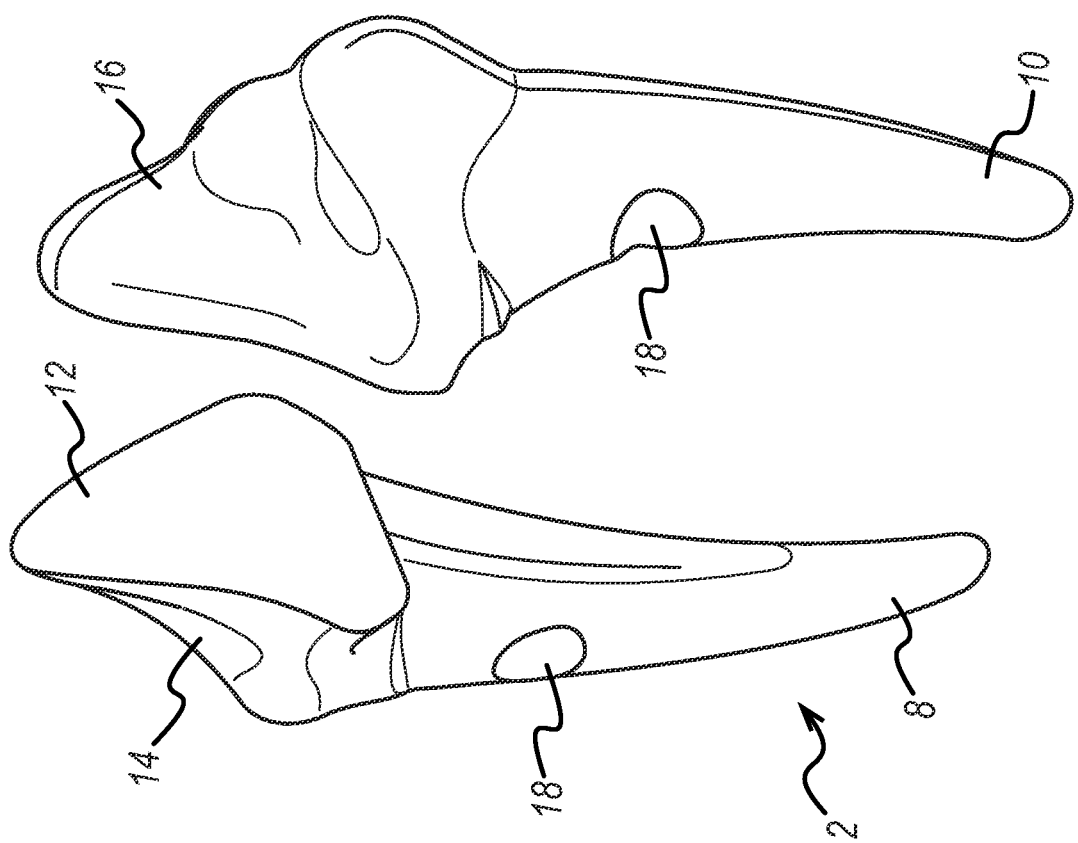
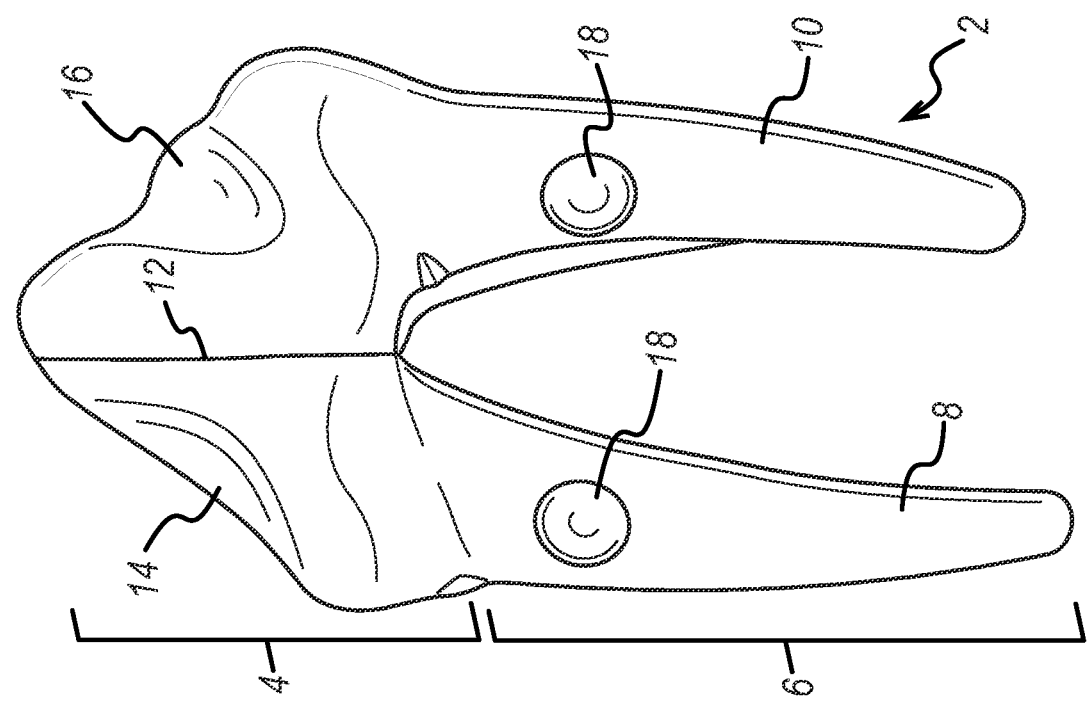

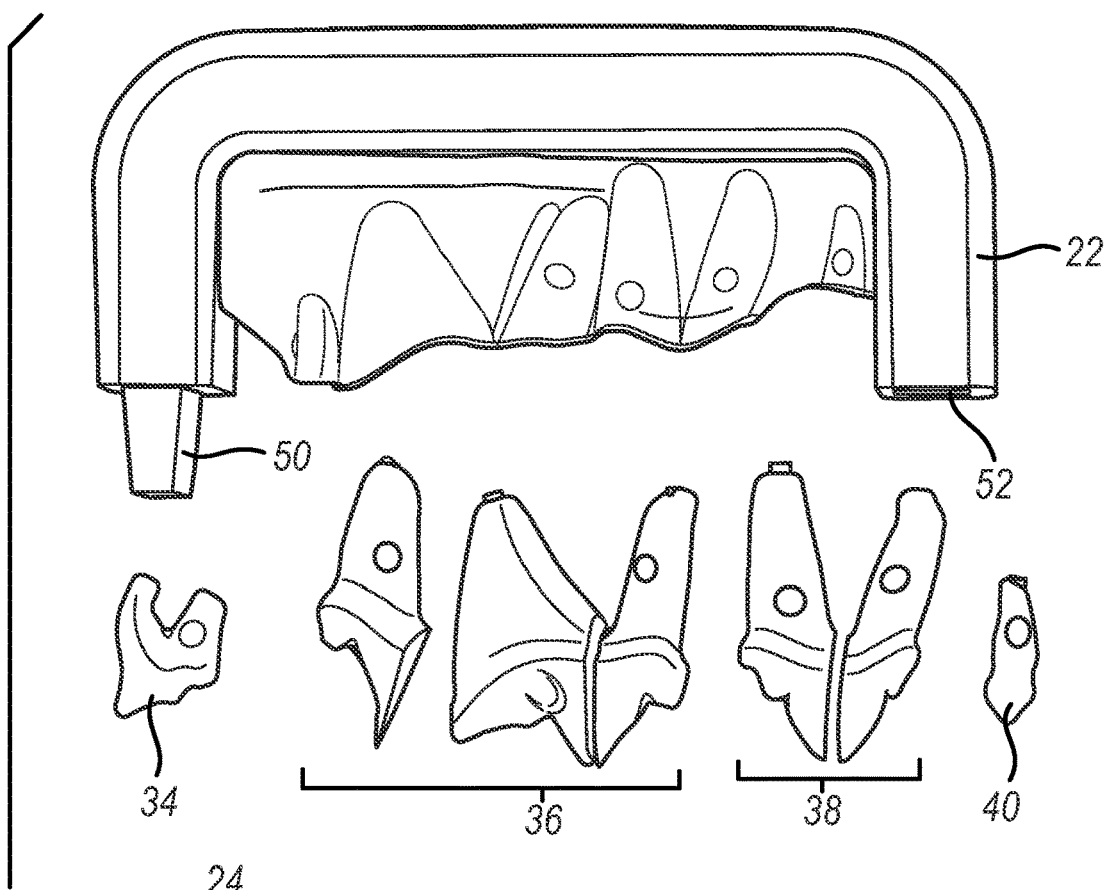
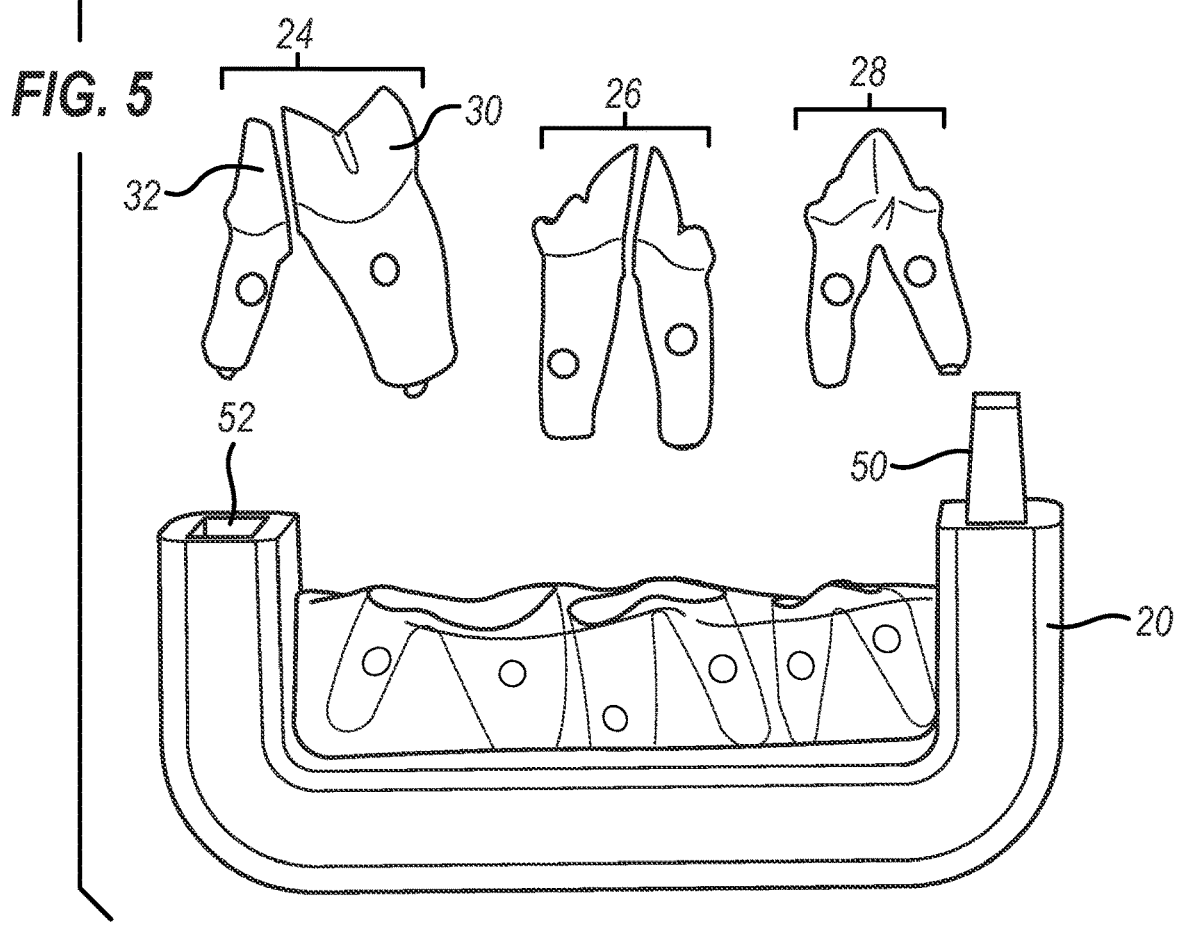
FIG. 5

ANIMAL DENTISTRY TRAINING APPARATUS

CROSS-REFERENCE TO RELATED APPLICATIONS

This application is a national stage application, filed under 35 U.S.C. § 371, of International Application No. PCT/GB2016/052721, filed Sep. 2, 2016, which claims priority to GB Patent App. Serial No. 1515722.5, filed on Sep. 4, 2015, the entire contents of each being incorporated by reference herein for any and all purposes.

This invention relates to an animal dentistry apparatus. It also relates to a method for determining an approach for extracting an animal tooth and a method for extracting an animal tooth.

The extraction of animal teeth may be required for the on-going health of the animal. However, tooth extraction is a challenging procedure for veterinary practitioners. The aim of the extraction is to remove the entire tooth with the minimum amount of trauma being caused to the adjacent remaining tissues. It is found that the best success rate in tooth extraction is achieved by practitioners who have knowledge of the tooth root morphology and who also utilise the correct technique for extracting the tooth.

The extraction of animal teeth with multiple roots is particularly complicated. Each of the roots of the tooth may diverge meaning that each root will have a different optimal direction for removal from its socket. So as to minimise the trauma caused to the adjacent tissues, multi-rooted teeth should first be sectioned into separate parts so that the tooth can be extracted as single root pieces one at a time.

During training, veterinary practitioners only dedicate a limited amount of time to animal dentistry and so many veterinary practitioners are under prepared when it comes to performing a tooth extraction in practice. This leads to an increased rate of unsuccessful extractions and an increased rate of trauma for the animal patients. The present invention addresses this problem.

The present invention provides an animal dentistry apparatus comprising a sectioned artificial tooth, wherein the sectioned artificial tooth comprises a crown portion and a furcate root portion, the furcate root portion comprising a plurality of roots; and a base, wherein the base comprises a receiving portion configured to receive and releasably retain each root of the furcate root portion; wherein the sectioned artificial tooth is sectioned into a plurality of sections, each of the plurality of sections comprising one or more but not all of said roots of the furcate root portion and part of the crown portion, the plurality of sections being contiguous when the sectioned artificial tooth is received in the receiving portion.

The animal dentistry apparatus allows the user to assess the effect of a particular tooth sectioning approach on the extraction of multi-rooted teeth and to perform the extraction of such a sectioned tooth on the apparatus prior to performing an extraction on an animal patient. This allows the practitioner to assess and optimise several aspects of the extraction procedure for a given multi-root morphology. The aspects that can be assessed and optimised include the form of sectioning used, the order in which the different sections are removed and the direction, or trajectory, for each section removal. The apparatus therefore has the potential to improve the extraction success rate of the practitioner.

As noted above, the sectioned artificial tooth comprises a crown portion and a furcate root portion. The crown portion is representative of the exposed portion of an actual tooth, i.e. the section of an actual tooth that can be seen above the gum line. The root portion is representative of the part of an actual tooth that is concealed within the socket of the jaw.

The furcate root portion refers to a root portion that has multiple individual roots connected together by a single crown portion. The plurality of roots may diverge, i.e. the roots have longitudinal axes that run along diverging directions. Sectioning of the crown portion of such a tooth can result in the roots of the furcate root portion being separated. In this way, root portions can be extracted separately.

The sectioned artificial tooth can be made of any rigid material. For example the artificial tooth could be made from a plastic, in particular polycarbonate. The sectioned artificial tooth may be formed by injection moulding. Each section of the sectioned artificial tooth may be made separately. Alternatively, a whole artificial tooth may be manufactured and subsequently sectioned to produce the sectioned artificial tooth.

The base of the animal dentistry apparatus receives the roots of the sectioned artificial tooth. In particular, each root of the sectioned artificial tooth is received in a receiving portion of the base and is releasably retained. The term "releasably retain" refers to the ability to remove the sectioned artificial tooth and in particular its roots from the base receiving portion. This means that each root is secured into the base in a manner that allows its removal. This allows the user of the apparatus to perform the removal of the roots from the receiving portion and assess the optimum extraction order for the sections of the sectioned artificial tooth and the optimum extraction path for each section.

The roots may be replaceable in the base so that they are releasably retained. This allows the user of the apparatus to assess the extraction approach using multiple removals of the same section of the sectioned artificial tooth and also ensures that the apparatus is reusable.

When the roots of the sectioned artificial tooth are received in the receiving portion, substantially the entire surface of each root is within the receiving portion of the base. In this way the receiving portion of the base acts as the artificial tooth's socket, completely enclosing the root from all sides while leaving the crown portion of the sectioned artificial tooth exposed.

The receiving portion is preferably shaped in a complementary manner to the corresponding root that it is configured to receive so as to retain the tooth in a particular orientation.

When the roots of the sectioned artificial tooth are received in the receiving portion, substantially the entire surface of each root may be in contact with the receiving portion of the base. In this way, the base provides a frictional force between the root and the receiving portion so as to retain each root in a manner that the root can be extracted when sufficient extraction force is applied by the user.

The base may be made of a resilient material so as to assist in retaining the roots of the furcate root portion and also for emulating, to some extent, the behaviour of the socket of an animal jaw. In particular, the base may be formed of an elastomeric material, such as silicone rubber. The base may be moulded into shape. The moulding can be achieved by cold forming of base material, i.e. cold forming of the silicone rubber.

As noted above, the sectioned artificial tooth is sectioned into a plurality of sections. The combination of all of these sections forms a complete artificial tooth with no missing parts. Further, the receiving portion of the base is arranged such that when these plurality of sections are received in the receiving portion, they are contiguous. In other words, the sectioned artificial tooth when received in the receiving portion is arranged as a complete artificial tooth.

The sectioned artificial tooth is sectioned such that each of the sections comprises one or more but not all of the roots of the artificial tooth's furcate root portion. Each section of the sectioned artificial tooth also comprises part of the crown portion of the artificial tooth. The user of the apparatus can thus assess the effect of sectioning a tooth so as to divide the entire furcate root portion into sections which comprise less than the total number of roots of the sectioned artificial tooth.

Each section of the sectioned artificial tooth consists of a complete root or complete roots. In other words, none of the sections of the sectioned artificial tooth include a sectioned part of a root. In a practical tooth extraction, the veterinary practitioner is unable to section the actual roots of a tooth without causing a significant amount of trauma to the animal patient. The animal dentistry apparatus described herein is therefore not concerned with such a procedure.

Each of the plurality of sections may consist of one root of the furcate root portion. This represents the preferable approach for sectioning and extracting animal teeth wherein the tooth is sectioned so as to allow the extraction of single root pieces individually. Therefore, this allows the user of the apparatus to assess the effect of sectioning an artificial tooth so as to leave sections that consist of only one root. This has the potential to improve the user's technique when extracting teeth in practice.

It is possible that at least one of the plurality of sections consists of two roots of the furcate root portion. This allows the user to assess the effect of sectioning a tooth in such a manner that two-root sections remain. Sectioning the tooth so that at least one section consist of greater than two roots is also possible.

Each root of the sectioned artificial tooth may have a protrusion or an indentation. This protrusion or indentation may appear anywhere on the surface of the root of the sectioned artificial tooth. The receiving portion has a corresponding indentation or protrusion that can effectively mate with the protrusion or indentation on the appropriate root when the root is received in the receiving portion. The mating of the indentation and protrusions on the two components contributes to an interference fit when the sectioned artificial tooth is received in the base. In this way, the retention of the furcate root portion of the sectioned artificial tooth in the receiving portion is improved. The mating of the protrusion and indentation can also help indicate that the root is in the correct orientation in the receiving portion It is preferred that the protrusion on the tooth or in the receiving portion is positioned so as to protrude, at least partly, perpendicular to the removal direction of the relevant root. This ensures that the protrusion contributes to retaining the root in the receiving portion.

The protrusion and corresponding indentation can be of the form of any 3 dimensional shape. The only requirement is that the protrusion and indentation are corresponding shapes that allow the mating of the protrusion in the indentation. In particular, the protrusion may be a dome-shaped protrusion and the indentation a corresponding dome-shaped indentation.

At least a portion of the base of the animal dentistry apparatus may be transparent or translucent. In this way, the user is able to observe the root portion of the sectioned artificial tooth when it is received in the receiving portion. This allows the user to see the root morphology of the sectioned artificial tooth. The ability to see the roots in-situ assists the user in assessing the relationship between root morphology, sectioning approach, extraction order and extraction direction. It also helps provide visual feedback when the user extracts the artificial tooth from the base. This extra level of visual feedback, which is not possible with an actual animal, has the potential to improve the user's extraction technique.

As indicated above, it is preferable that at least the receiving portion is transparent or translucent. However, the entire base may be transparent or translucent.

The sectioned artificial tooth of the animal dentistry apparatus may be a substantial reproduction of a natural animal tooth. In this way, the animal dentistry apparatus reflects the real life situation of a specific multi-rooted animal tooth. It therefore allows the user to assess a particular sectioning technique on a given animal tooth. When the sectioned artificial tooth is a substantial reproduction of a natural animal tooth it reproduces the essential features of the tooth in a manner that allows the user to identify the type of tooth. Accordingly, the root and crown morphology of the natural tooth are replicated.

Possible teeth to substantially reproduce for the animal dentistry apparatus are multi-rooted molars and multi-rooted premolars, especially those of dogs and cats.

Specific teeth that can be reproduced can be identified using the Modified Triadan System. The Modified Triadan System uses three digits to uniquely identify teeth. The first digit identifies the quadrant of the jaw in which the tooth lies: 1 for right upper, 2 for left upper, 3 for left lower and 4 for right lower. The next two digits denote the tooth position within the quadrant, counting up from frontmost tooth in jaw. For example the frontmost tooth in a dog's right upper quadrant is an incisor and is accordingly denoted 101, the backmost tooth in the dog's right upper quadrant is a molar and is denoted 110, since it is the tenth tooth in sequence from the incisor denoted 101.

Possible multi-rooted teeth that can be substantially reproduced as the sectioned artificial tooth described herein are dog teeth denoted by the Modified Triadan System as 106, 107, 108, 109, 110, 206, 207, 208, 209, 210, 307, 308, 309, 310, 311, 407, 408, 409, 410 and 411.

Further possible multi-rooted teeth that can be substantially reproduced as the sectioned artificial tooth described herein are cat teeth denoted by the Modified Triadan System as 106, 107, 108, 109, 206, 207, 208, 209, 307, 308, 309, 407, 408 and 409.

The receiving portion of the base may be a substantial reproduction of the part of an animal jaw in which a natural animal tooth is naturally found. When coupled with a substantial reproduction of a natural animal tooth, this results in the animal dentistry apparatus being a substantial reproduction of a section of the animal jaw complete with animal tooth that can be extracted. This allows the user to utilise the dentistry apparatus as a direct reference for the extraction of the corresponding tooth in an actual animal. In this way, the user can see the effect of sectioning on this tooth using the animal dentistry apparatus and then decide whether to apply or adapt this approach for the actual animal tooth extraction. This can improve the technique of the practitioner by allowing them to visualise the section before actual sectioning, and also to practice the optimal extraction order and optimal extraction path for the sectioned tooth prior to operating on the animal.

The animal dentistry apparatus may have a sectioned artificial tooth that is sectioned in a manner that represents the sectioning that facilitates removal of the corresponding natural animal tooth. The animal dentistry apparatus is therefore depicting the sectioning that will assist in the removal of the natural tooth and so reduce the trauma to the animal patient. This allows the user to visualise a desired sectioning prior to carrying out the sectioning and also to experience the optimal extraction order and extraction path. Again, the opportunity assess the extraction on the apparatus before extraction of the animal tooth has the potential to lead to a higher success rate in relation to tooth extraction and reduce the trauma experienced by the animal patient.

When referring to the facilitation of removal of the natural tooth, this refers to any sectioning that will result in an easier extraction for the practitioner and help reduce trauma to the animal patient.

The animal dentistry apparatus is not confined to having just one sectioned tooth. The ability to have a plurality of sectioned teeth allows the dentistry apparatus to provide the user with a variety of different tooth types and sectioning approaches. In this way, one animal dentistry apparatus may assist the practitioner with a range of different extraction procedures. Accordingly, the apparatus may comprise a plurality of sectioned artificial teeth, wherein each of the sectioned artificial teeth is in accordance with the sectioned artificial tooth as described herein; and the base comprises a plurality of receiving portions, each of the receiving portions being in accordance with the receiving portion disclosed herein, wherein each of the plurality of receiving portions corresponds to and is configured to receive and releasably retain one of the plurality of sectioned artificial teeth.

Each of the plurality of sectioned artificial teeth may be a different type of tooth. When referring to different types of teeth herein, in general terms this refers to teeth that are of a different category, i.e. molars, premolar, canine and incisors. However, different types of teeth can also be more specifically defined as teeth that are assigned different numbers in the Modified Triadan System. For example one tooth may be a 408 premolar and another tooth may be a 407 premolar etc. Alternatively or in addition, each of the teeth may represent one or more teeth from different animals. Such an apparatus has the convenience of providing one reference point for a plurality of animals and/or tooth types.

The plurality of sectioned artificial teeth may be two teeth, or three teeth, or four teeth, or five teeth or more than five teeth. There will then be a corresponding number of receiving portions.

It should also be noted that when a plurality of sectioned teeth are present, each of the sectioned teeth may be of a different form or each of the sectioned teeth may be of the same form. Such changes in form include different forms of sectioning. It is particularly preferred that each of the sectioned teeth is of a different form so as to increase the number of scenarios that the animal dentistry apparatus presents to the user.

The animal dentistry apparatus may comprise at least one non-sectioned non-furcate artificial tooth, the non-sectioned, non-furcate artificial tooth comprising a crown portion and a root portion consisting of one root, wherein the base comprises at least one receiving portion configured to receive and releasably retain the root of the at least one non-sectioned, non-furcate artificial tooth.

The presence of non-sectioned, non-furcate artificial teeth provides a contrast to the sectioned furcate artificial tooth. This enables the user to compare the requirements of multi-rooted teeth with single rooted teeth and so appreciate the different technique required for the extraction of each. Where the non-sectioned, non-furcate tooth is a substantial reproduction of a natural tooth, this also assists the user in identifying teeth that do not require sectioning for extraction and so avoids unnecessary sectioning.

The animal dentistry apparatus may further comprise at least one non-sectioned furcate artificial tooth, the non-sectioned furcate artificial tooth comprising a crown portion and a furcate root portion, the furcate root portion comprising a plurality of roots, wherein the base comprises at least one receiving portion configured to receive and releasably retain each root of the furcate root portion of the at least one non-sectioned furcate artificial tooth.

The presence of a non-sectioned multi-rooted artificial tooth allows the user to compare the extraction of a multi-rooted tooth without sectioning with the preferred approach of extracting a multi-rooted tooth following sectioning. This may assist the user in determining when sectioning is required. It may also be used to indicate the type of multi-rooted teeth that may not require sectioning prior to extraction.

The animal dentistry apparatus may comprise a further plurality of sectioned artificial teeth corresponding to a further base. The further plurality of sectioned artificial teeth and the further base having the features described herein for the plurality of sectioned artificial teeth and the base.

The presence of a further base allows the animal dentistry apparatus to depict a further plurality of tooth extraction scenarios. In particular, it may be preferable that the base and the further base along with the corresponding plurality of sectioned artificial teeth and further plurality of sectioned artificial teeth reproduce different portions of an animal jaw. For example, the base may represent a portion of the lower jaw, while the further base may represent a portion of the upper jaw, both bases having the corresponding artificial reproductions of teeth for that portion. This therefore allows one apparatus to demonstrate the extraction of teeth from a plurality of portions of an animal. Alternatively, the base and the further base may represent the teeth and jaw of different animals.

The base and further base may be configured to connect together. This allows for easy storage of the base and further base as one unit and reduces the possibility of misplacing one of the base or further base. In particular, the base and further base may be shaped in a complementary manner so that the base and further base can connect together.

When it is described herein that the animal dentistry apparatus may have certain aspects that reproduce the natural appearance of an animal, this may be any animal. However, it is particularly preferred that this animal is a cat or a dog, since cats and dogs commonly undergo tooth extraction in a veterinary setting.

As noted above, any combination of artificial teeth with any combination of the features described herein can be combined when the animal dentistry apparatus comprises a plurality of artificial teeth, as long as at least one of the teeth is a sectioned artificial tooth with multiple roots.

A possible combination for the plurality of artificial teeth are those that are a substantial reproduction of the dog teeth selected from those denoted in the Modified Triadan System as 407, 408, 409, 410 and 411. It is particularly preferred that the plurality of artificial teeth includes all of these.

A further possible combination for the plurality of artificial teeth are those that are a substantial reproduction of the dog teeth selected from those denoted in the Modified Triadan System as 307, 308, 309, 310 and 311. It is particularly preferred that the plurality of artificial teeth includes all of these.

An alternative preferred combination for the plurality of artificial teeth are those that are a substantial reproduction of the dog teeth selected from those denoted in the Modified Triadan System as 106, 107, 108, 109 and 110. It is particularly preferred that the plurality of artificial teeth includes all of these.

A further alternative preferred combination for the plurality of artificial teeth are those that are a substantial reproduction of the dog teeth selected from those denoted in the Modified Triadan System as 206, 207, 208, 209 and 210. It is particularly preferred that the plurality of artificial teeth includes all of these.

When a base and further base are present, the plurality of artificial teeth corresponding to the base may be substantial reproductions of dog teeth that include those denoted in the Modified Triadan System as 407, 408, 409, 410 and 411, and the further plurality of artificial teeth corresponding to the further base may be substantial reproductions of dog teeth that include those denoted in the Modified Triadan System as 106, 107, 108, 109 and 110.

Alternatively, when a base and further base are present, the plurality of artificial teeth corresponding to the base may be substantial reproductions of dog teeth that include those denoted in the Modified Triadan System as 307, 308, 309, 310 and 311, and the further plurality of artificial teeth corresponding to the further base may be substantial reproductions of dog teeth that include those denoted in the Modified Triadan System as 206, 207, 208, 209 and 210.

A possible combination for the plurality of artificial teeth are those that are a substantial reproduction of the cat teeth selected from those denoted in the Modified Triadan System as 407, 408 and 409. It is particularly preferred that the plurality of artificial teeth includes all of these.

A further possible combination for the plurality of artificial teeth are those that are a substantial reproduction of the cat teeth selected from those denoted in the Modified Triadan System as 307, 308 and 309. It is particularly preferred that the plurality of artificial teeth includes all of these.

An alternative preferred combination for the plurality of artificial teeth are those that are a substantial reproduction of the cat teeth selected from those denoted in the Modified Triadan System as 106, 107, 108 and 109. It is particularly preferred that the plurality of artificial teeth includes all of these.

A further alternative preferred combination for the plurality of artificial teeth are those that are a substantial reproduction of the cat teeth selected from those denoted in the Modified Triadan System as 206, 207, 208 and 209. It is particularly preferred that the plurality of artificial teeth includes all of these.

When a base and further base are present, the plurality of artificial teeth corresponding to the base may be substantial reproductions of cat teeth that include those denoted in the Modified Triadan System as 407, 408 and 409, and the further plurality of artificial teeth corresponding to the further base may be substantial reproductions of cat teeth that include those denoted in the Modified Triadan System as 106, 107, 108 and 109.

Alternatively, when a base and further base are present, the plurality of artificial teeth corresponding to the base may be substantial reproductions of cat teeth that include those denoted in the Modified Triadan System as 307, 308 and 309, and the further plurality of artificial teeth corresponding to the further base may be substantial reproductions of cat teeth that include those denoted in the Modified Triadan System as 206, 207, 208 and 209.

The present invention also provides an animal dentistry kit. The animal dentistry kit comprises an animal dentistry apparatus as disclosed herein and instructional material describing the extraction of animal teeth. Where the animal dentistry apparatus includes a reproduction of a particular animal, the instructional material may be tailored towards the extraction of the teeth of that particular animal. The instructional material may be provided in hard copy, e.g. as a leaflet or pamphlet. Alternatively, the instructional material may be provided on a computer readable media, such as CD ROM, DVD etc. Further, the instructional material may be supplemented with material available for access on the World Wide Web.

Such an animal dentistry kit assists the user in the process of extracting teeth from an animal.

The present invention further provides a method of determining an approach for extracting an animal tooth from a living animal comprising, identifying the animal tooth to be extracted from the living animal; inspecting the animal dentistry apparatus described herein and identifying the sectioned artificial tooth corresponding to the identified animal tooth to determine the sectioning required to facilitate the extraction of the animal tooth and optionally also to determine the appropriate order and trajectory of extraction of each section of the sectioned animal tooth.

Utilising the animal dentistry apparatus described herein improves the practitioner's technique for a subsequent tooth extraction. In particular, the animal dentistry apparatus allows the practitioner to experience what a particular sectioning approach achieves in relation to the subsequent extraction of the tooth. In this way, the practitioner can optimise the sectioning approach adopted for the tooth sectioning. Further, the method also allows the practitioner to experience the required order and trajectory for extracting sectioned animal teeth. Again, this experience before the actual extraction of the animal teeth primes the practitioner to extract the sectioned tooth in the optimal order and in a smooth manner that minimises trauma to adjacent tissues.

Following the determination of the approach for extracting the animal tooth from a living animal, the practitioner can section the animal tooth into a plurality of sections in accordance with the animal dentistry apparatus and then subsequently extract each of the plurality of sections of the animal tooth in separate extraction steps.

As noted above, utilising the animal dentistry apparatus described herein ahead of an actual extraction can result in an improved technique and reduced incidence of trauma to the animal patient.

It should be noted that any form of the animal dentistry apparatus can be used with the methods described herein. However the methods described herein are particularly effective when the animal dentistry apparatus includes a substantial reproduction of an actual animal tooth and/or jaw within which the animal tooth is naturally found.

The invention will now be described with reference to the following figures.

FIG. 1 depicts a front view of sectioned artificial tooth for use with the present invention.

FIG. 2 depicts a perspective view of the sectioned artificial tooth of FIG. 1 separated into its two sections.

FIG. 5 depicts an exploded view of the animal dentistry apparatus of FIG. 3.

Figure 3:
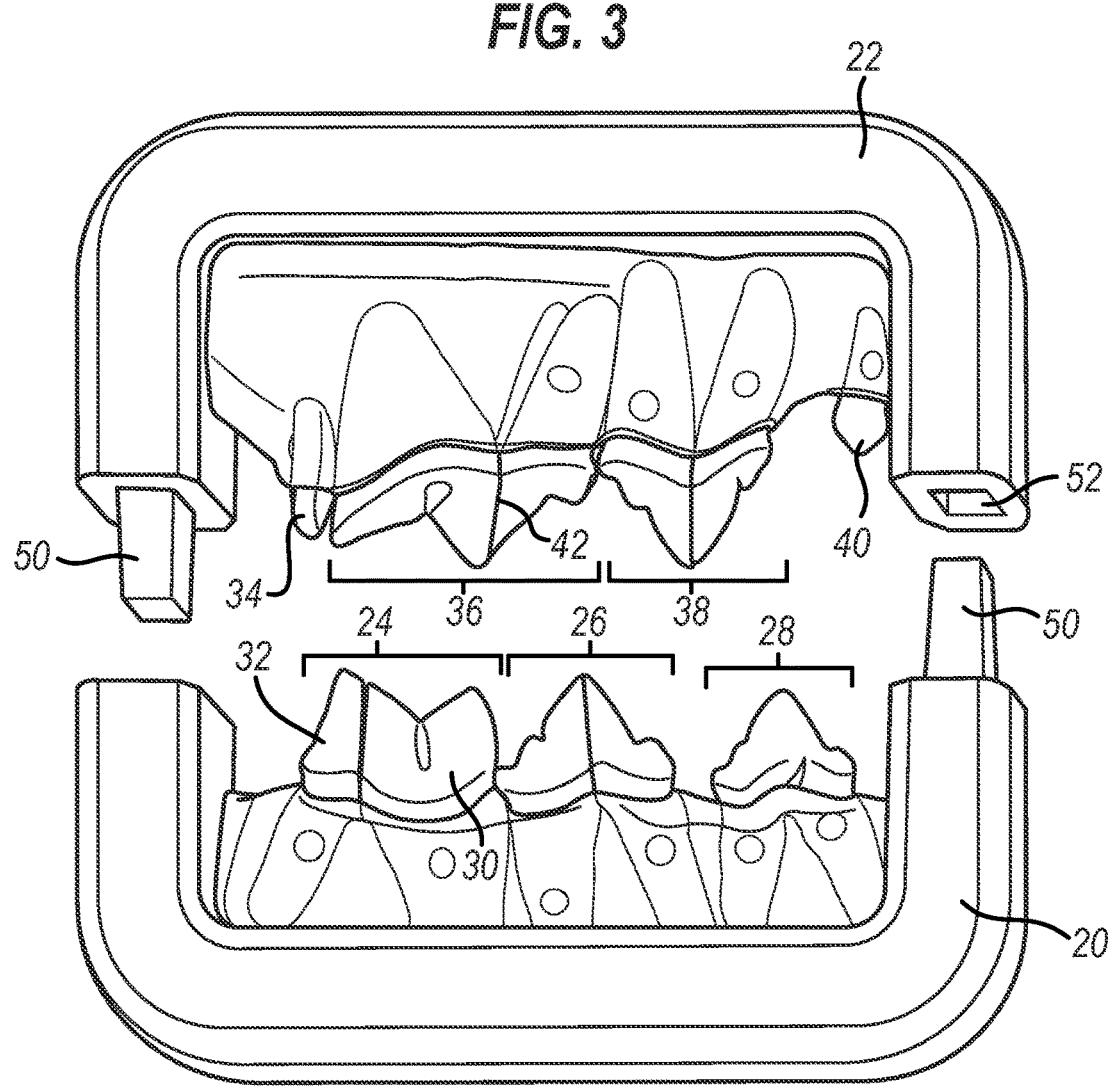
FIG. 3 depicts a front view of an animal dentistry apparatus according to the present invention.

FIG. 1 depicts a single sectioned artificial tooth 2 that has a crown portion 4 and a furcate root portion 6. The furcate root portion has two roots 8,10. The sectioned artificial tooth 2 is sectioned along a plane 12 into two sections. Each section has one root 8,10 and part of the crown portion 14,16. As can be seen in FIG. 1, the two sections of the sectioned artificial tooth are contiguous along the sectioning line 12. Further, the sectioned tooth would be arranged in a base such that the two sections are contiguous as shown in FIG. 1.

The sectioned artificial tooth of FIG. 1 further has circular indentations 18 which interact with corresponding protrusions in the base to assist in retaining the roots within the receiving portion of the base.

FIG. 2 depicts the sectioned artificial tooth of FIG. 1 in a separated arrangement.

The artificial sectioned tooth depicted in FIGS. 1 and 2 is a substantial reproduction of a dog tooth and the sectioning plane 12 demonstrates a potential place to section the tooth so as to easily extract the two roots separately. The depicted dog tooth is the right lower premolar, denoted 408 using the Modified Triadan System.

The ability for the user of the animal dentistry apparatus to manipulate the sectioned tooth of FIGS. 1 and 2 would demonstrate to the user that there is a preferred removal order of the two roots 8,10 where one root 8 should be removed after the other root 10 since the optimum trajectory for removal of one root 8 is impinged by the crown portion attached to the other root 10.

FIG. 3 depicts a base 20 and a further base 22. The base 20 has three teeth associated with it 24,26,28. The teeth are substantial reproductions of cat teeth. Specifically one of the teeth 24 is a substantial reproduction of a right lower molar (denoted 409 using the Modified Triadan System). Another tooth 26 is a substantial reproduction of a right lower premolar (denoted 408 using the Modified Triadan System). The other tooth 28 is another lower right premolar (denoted 407 using the Modified Triadan System). Each tooth is received in a corresponding receiving portion. The three receiving portions combine to form a continuous reproduction of a portion of a cat jaw, in this case the right lower jaw of a cat. Two of the teeth 24,26 are sectioned into two sections and all of the teeth 24,26,28 are furcate with two roots. The roots can be seen through the translucent base. The sectioning planes on two of the teeth 24,26 indicate a sectioning location that would facilitate the removal of the teeth as separate root portions. By having the ability to manipulate and see the root morphology of each sectioned tooth 24, the practitioner is able to see that the best order for removing the sections of the tooth 24 is to remove one section 30 before the other section 32. This is due to one section 30 impinging the optimum extraction path of the other section 32. Therefore, by utilising the animal dentistry apparatus the practitioner is able to carry out the sectioning and extraction in accordance with the apparatus in a manner that minimises the trauma to the animal patient.

The further base 22 has a further four teeth 34,36,38,40 each received in a corresponding receiving portion of the further base 22. The further sectioned teeth and the corresponding receiving portions are substantial reproductions of a portion of the right upper jaw of a cat. One of the teeth 34 is a substantial reproduction of the right upper molar denoted 109 using the Modified Triadan System. Another of the teeth 36 is a substantial reproduction of a right upper premolar denoted 108 using the Modified Triadan System. A further of the teeth 38 is a substantial reproduction of the right upper premolar denoted 107 using the Modified Triadan System. The other tooth 40 is a substantial reproduction of the right upper premolar denoted 106 in the Modified Triadan System.

Figure 4:
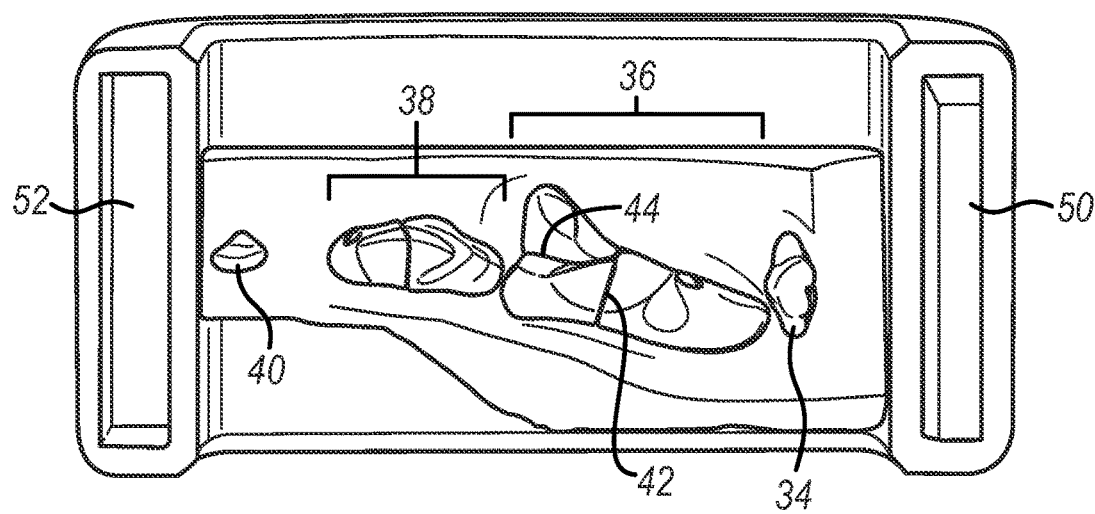
FIG. 4 depicts a top view of the base of the animal dentistry apparatus of FIG. 3.

Two of the teeth 36,38 are sectioned. Two of the teeth 34,40 are not sectioned. One of the non-sectioned teeth 34 has two roots, although this cannot be seen in FIG. 3, while one of the teeth 40 has just one root. One of the teeth 36 has three roots. This tooth is sectioned so as to produce three separate sections wherein each section has just one root. One of the sectioning planes 42 can be readily seen in FIG. 3. The second sectioning plane 44 of the three rooted tooth 36 can be seen from the plan view of FIG. 4. Again, the ability of the practitioner to be able to observe and manipulate this sectioned artificial tooth enables the practitioner to appreciate which approach will result in the least amount of trauma to the animal patient.

Each of the teeth in the base 20 and further base 22 are releasably retained in the corresponding receiving portions and so can be removed from this base, as depicted in FIG. 5.

The base 20 and the further base 22 have an extended section 50 and a complementary section 52 configured to receive the extended section 50 on the other part. In this manner the base 20 and further base 22 can be connected together. The extended sections 50 are retained in the complementary section 52 by a friction fit.

Figure 6:
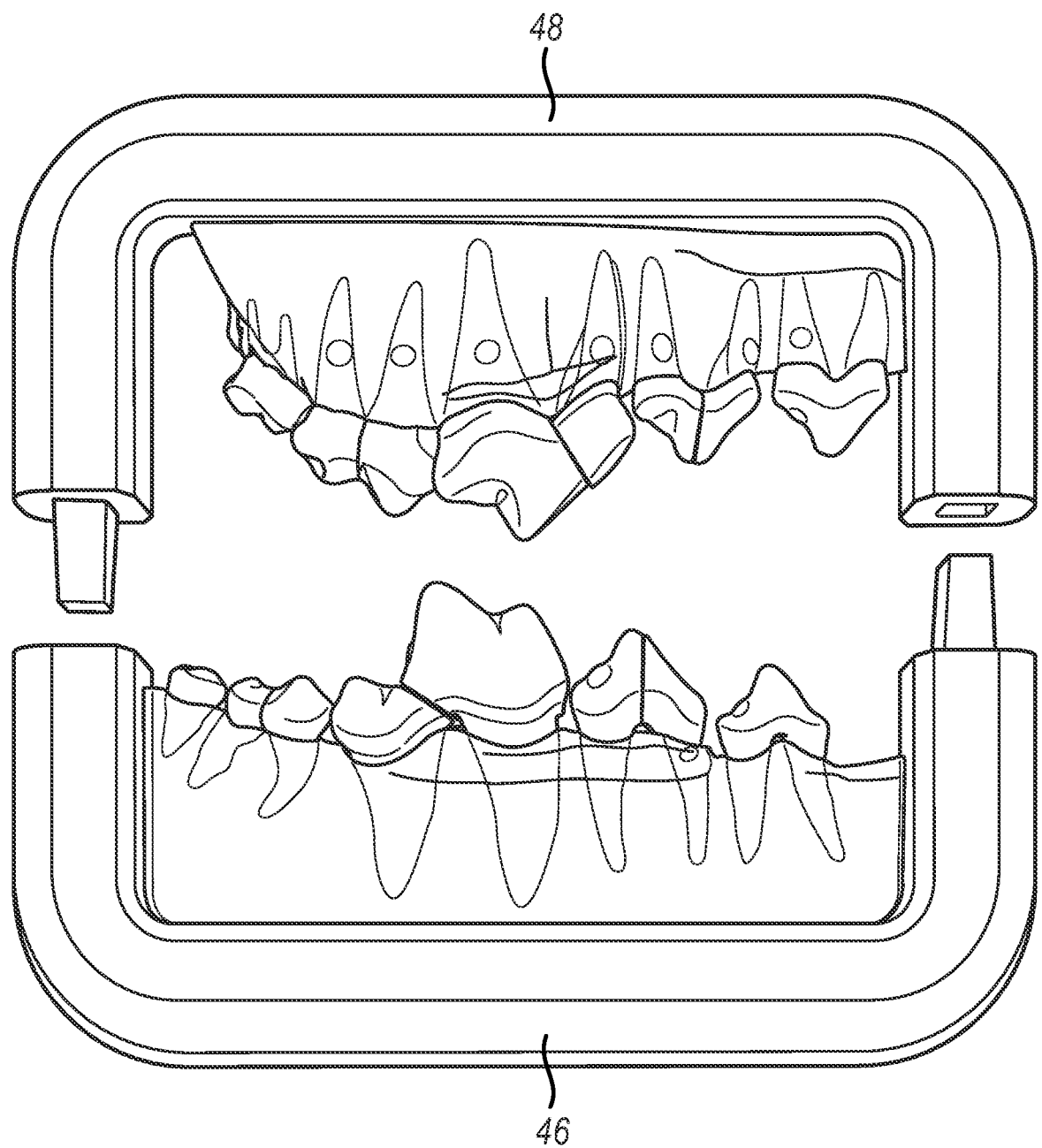
FIG. 6 depicts a further animal dentistry apparatus in accordance with the present invention.

The general approach of the present invention can be used for any specific animal. For example the depiction in FIG. 6 is of an animal dentistry apparatus for a dog where the receiving portions of base 46 and the corresponding artificial teeth are substantial reproductions of a portion of the right lower jaw of a dog. The further base 48 has a plurality of receiving portions and corresponding teeth that are substantial reproductions of a portion of the right upper jaw of a dog. As will be appreciated this approach can be replicated for any animal.

The foregoing detailed description illustrates the present invention. However, the scope of the invention is defined by the following claims.

The invention claimed is:

1. An animal dentistry apparatus comprising:
   a sectioned artificial tooth that includes a crown portion and a furcate root portion, the furcate root portion comprising a plurality of roots; and
   a base that defines a continuous reproduction of a portion of a jaw and includes a plurality of receiving portions, one of the receiving portions being configured to receive and releasably retain the plurality of roots of the sectioned artificial tooth;
   wherein the sectioned artificial tooth is sectioned into a first section and a second section, each of the first and second sections comprising one or more but not all of said roots of the furcate root portion and part of the crown portion, and
   wherein, when the sectioned artificial tooth is received in the one of the receiving portions, the first and second sections are contiguous and an optimal extraction path from the receiving portion of the first section is impinged by the second section.

2. The animal dentistry apparatus of claim 1, wherein each of the first and second sections consists of one root of the furcate root portion.

3. The animal dentistry apparatus of claim 1, wherein the first section, the second section, or both section consists of two roots of the furcate root portion.

4. The animal dentistry apparatus of claim 1, wherein each root of the sectioned artificial tooth has a protrusion or an indentation and the one of the receiving portions has a corresponding indentation or protrusion respectively, to assist in retaining the furcate root portion of the sectioned artificial tooth in the one of the receiving portions.

5. The animal dentistry apparatus of claim 1, wherein at least a portion of the base is transparent or translucent so as to allow observation of the furcate root portion of the sectioned artificial tooth when it is received in the one of the receiving portions.

6. The animal dentistry apparatus of claim 1, wherein the sectioned artificial tooth is a substantial reproduction of a natural animal tooth.

7. The animal dentistry apparatus of claim 6, wherein the sectioned artificial tooth is sectioned in a manner representing the sectioning that facilitates removal of a corresponding natural tooth.

8. The animal dentistry apparatus of claim 1, comprising at least one non-sectioned non-furcate artificial tooth, the non-sectioned non-furcate artificial tooth comprising a crown portion and a root portion consisting of one root, wherein another one of the receiving portions is configured to receive and releasably retain the root of the at least one non-sectioned non-furcate artificial tooth.

9. The animal dentistry apparatus of claim 1, comprising at least one non-sectioned furcate artificial tooth, the non-sectioned furcate artificial tooth comprising a crown portion and a furcate root portion, the furcate root portion comprising a plurality of roots, wherein another one of the receiving portions is configured to receive and releasably retain eaeh the plurality of roots of the at least one non-sectioned furcate artificial tooth.

10. The animal dentistry apparatus of claim 6, wherein the jaw corresponds to a cat jaw or a dog jaw.

11. An animal dentistry kit comprising:
   an animal dentistry apparatus comprising
      a sectioned artificial tooth that includes a crown portion and a furcate root portion, the furcate root portion comprising a plurality of roots; and
      a base that defines a continuous reproduction of a portion of a jaw and includes a plurality of receiving portions, one of the receiving portions being configured to receive and releasably retain the plurality of roots of the sectioned artificial tooth;
   wherein the sectioned artificial tooth is sectioned into a first section and a second section, each of the first and second sections comprising one or more but not all of said roots of the furcate root portion and part of the crown portion, and
   wherein, when the sectioned artificial tooth is received in the one of the receiving portions, the first and second sections are contiguous and an optimal extraction path from the receiving portion of the first section is impinged by the second section; and
   instructional material describing the extraction of animal teeth.

12. A method of extracting an animal tooth from a living animal comprising:
   providing an animal dentistry apparatus comprising
      a sectioned artificial tooth that includes a crown portion and a furcate root portion, the furcate root portion comprising a plurality of roots; and
      a base that defines a continuous reproduction of a portion of a jaw and includes a plurality of receiving portions, one of the receiving portions being configured to receive and releasably retain the plurality of roots of the sectioned artificial tooth;
   wherein the sectioned artificial tooth is sectioned into a first section and a second section, each of the first and second sections comprising one or more but not all of said roots of the furcate root portion and part of the crown portion, and
   wherein, when the sectioned artificial tooth is received in the one of the receiving portions, the first and second sections are contiguous and an optimal extraction path from the receiving portion of the first section is impinged by the second section;
   sectioning the sectioned artificial tooth into the first section and the second section in accordance with the animal dentistry apparatus; and
   extracting the second section in an extraction step before extracting the first section in a separate extraction step.

* * * * *